US 6,476,139 B2
Nov. 5, 2002

(12) United States Patent
Akaike et al.

(10) Patent No.: US 6,476,139 B2
(45) Date of Patent: Nov. 5, 2002

(54) OLEFIN-BASED THERMOPLASTIC ELASTOMER AND MOLDED PRODUCT PRODUCED THEREFROM

(75) Inventors: Osamu Akaike, Tokyo (JP); Asami Hirashima, Yokkaichi (JP); Tatsumi Tsuji, Yokkaichi (JP); Motoko Itou, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 29 days.

(21) Appl. No.: 09/819,934

(22) Filed: Mar. 28, 2001

(65) Prior Publication Data

US 2001/0028932 A1 Oct. 11, 2001

(30) Foreign Application Priority Data

Mar. 31, 2000 (JP) ........................................ 2000-096752

(51) Int. Cl.⁷ ............................ C08L 23/10; C08L 23/16
(52) U.S. Cl. ...................... 525/191; 525/210; 525/232; 525/240; 525/241
(58) Field of Search ................................ 525/191, 210, 525/232, 240, 241

(56) References Cited

FOREIGN PATENT DOCUMENTS

| EP | 0 368 395 | 5/1990 |
|---|---|---|
| GB | 2 077 436 | 12/1981 |
| GB | 2 131 953 | 6/1984 |

OTHER PUBLICATIONS

European Search Report.

*Primary Examiner*—Nathan M. Nutter
(74) *Attorney, Agent, or Firm*—Dike, Bronstein, Roberts & Cushman; David G. Conlin; John Joseph Penny V (57) ABSTRACT

An olefin-based thermoplastic elastomer comprises a propylene-based resin (A) and an olefin-based copolymer rubber (B), and has a ratio ($N_1/SS$) of first normal stress difference ($N_1$) to shear stress (SS) of 0.6:1 to 1.4:1 said first normal stress difference ($N_1$) and shear stress (SS) being determined by subjecting said elastomer to step shear test at a temperature of 200° C. and a shear rate of 25.1 sec$^{-1}$. Such olefin-based thermoplastic elastomer shows excellent moldability, transferability of embossed patterns and mechanical strength.

8 Claims, 3 Drawing Sheets

OLEFIN-BASED THERMOPLASTIC ELASTOMER AND MOLDED PRODUCT PRODUCED THEREFROM

BACKGROUND OF THE INVENTION

The present invention relates to an olefin-based thermoplastic elastomer comprising a composition containing a propylene-based resin and an olefin-based copolymer rubber, and more particularly, to an olefin-based thermoplastic elastomer which is excellent in moldability, transferability of embossed patterns and mechanical strength, is capable of providing a molded product being free from appearance defects such as an uneven luster, weld marks and flow marks even when the thickness thereof is varied over a wide range, and is suitable for forming automobile interior trims or parts, especially a cover for accommodating an air bag.

In recent years, thermoplastic elastomers such as styrene-based elastomers, olefins-based elastomers, polyesters-based elastomers, polyamides-based elastomers, polyurethane-based elastomers, etc., which are rubber-like soft materials and exhibit a good moldability compatible with that of thermoplastic resins without valcunization process, have been noticed from the standpoints of productivity, recyclability or the like, and have been extensively used in various applications such as automobile parts, electrical appliances, medical apparatuses or components thereof, electric wires and sundries. Among these elastomers, compositions composed of a propylene-based resin and an olefin-based copolymer rubber such as an ethylene-propylene copolymer rubber or an ethylene-propylene-non-conjugated diene copolymer rubber, or olefin-based thermoplastic elastomers obtained by kinematically heat-treating the above compositions in the presence of an organic peroxide so as to allow the olefin-based copolymer rubber to be cross-linked and form a partially cross-linked product, have been especially noticed as economically useful materials because of inexpensiveness thereof. In addition, since the elastomers show an appropriate flexibility and are prevented from eliminating embossed patterns thereon even when subjected to thermoforming process, positive studies have been made to apply these elastomers to automobile interior trims or parts as alternative materials for conventional soft vinyl chloride resins.

Molded products such as typically automobile interior trims or parts generally include ribs for ensuring a mechanical strength thereof, or other components or fitting members for attachment to a base structure and, therefore, has both thin-wall and thick-wall portions therein, resulting in large change in thickness. Such a thickness change tends to cause appearance defects such as uneven luster, weld marks and flow marks on the surface of the molded product. In particular, since the olefin-based thermoplastic elastomers are in the form of not only a mixture but also a partially cross-linked product, non-uniform dispersion or coarse dispersion of cross-linked rubbers tends to be caused. Therefore, molded products produced from such olefin-based thermoplastic elastomers are more likely to suffer from the above-described appearance defects.

To solve problems concerning the above-described appearance defects, for example, Japanese Patent Application Laid-Open (KOKAI) No. 8-176394(1996) describes a thermoplastic elastomer composition exhibiting a die swell ratio of not less than 1.8 at a shear rate of $6.8 \times 10^3$ sec$^{-1}$ and comprising a propylene-based block copolymer resin, a specific hydrogenated aromatic vinyl-conjugated diene block copolymer, an ethylene-α-olefin copolymer rubber and paraffin-based process oils. Also, Japanese Patent Application Laid-Open (KOKAI) No. 10-259281(1998) describes a thermoplastic elastomer composition comprising a propylene-based resin, a specific hydrogenated aromatic vinyl-conjugated diene block copolymer and an ethylene-α-olefin copolymer rubber.

However, as a result of the present inventors' earnest studies, it has been found that these conventional thermoplastic elastomer compositions fail to fully satisfy requirements such as reduction in thickness of molded products due to recent tendency toward light-weight automobile parts, or enlargement in size of molded products due to recent tendency toward reduced number of parts, especially such a requirement that molded products having a large change in thickness, e.g., an air bag cover having a thin wall portion with a thickness as small as not more than 1 mm for inflation or deployment of an air bag received therein, should be free from appearance defects such as uneven luster, weld marks, flow marks or the like.

Under the circumstances, it has been found that the specified olefin-based thermoplastic elastomer obtained by mixing a propylene-based resin and an olefin-based copolymer rubber and having a specific ratio ($N_1/SS$) of first normal stress difference ($N_1$) to shear stress (SS), shows excellent moldability, transferability of embossed patterns and mechanical strength. The present invention has been attained based on the finding.

SUMMARY OF THE INVENTION

An object of the present invention is to provide an olefin-based thermoplastic elastomer comprising a composition containing a propylene-based resin and an olefin-based copolymer rubber, which is not only excellent in moldability, transferability of embossed patterns and mechanical strength, but also capable of providing a molded product being free from appearance defects such as uneven luster, weld marks and flow marks.

To accomplish the aim, in a first aspect of the present invention, there is provided an olefin-based thermoplastic elastomer comprising a propylene-based resin (A) and an olefin-based copolymer rubber (B), and exhibiting a ratio ($N_1/SS$) of first normal stress difference ($N_1$) to shear stress (SS) of 0.6:1 to 1.4:1 wherein the first normal stress difference ($N_1$) and shear stress (SS) are determined by subjecting the elastomer to step shear test at a temperature of 200° C. and a shear rate of 25.1 sec$^{-1}$.

In a second aspect of the present invention, there is provided a molded product formed from said olefin-based thermoplastic elastomer as defined in the above-mentioned first aspect, having an opening and/or a flat base plate comprising:

a thin-wall portion having a thickness in the range of from 5 to 50% of a thickness of said flat base plate, a thick-wall portion having a thickness in the range of from 110 to 200% of the thickness of said flat base plate, and/or a rib having a thickness in the range of from 5 to 200% of the thickness of said flat base plate.

BRIEF DESCRIPTION OF THE DRAWINGS

1(b) is a sectional view showing a thick-wall portion of the molded product shown in FIG. 1(a)

DETAILED DESCRIPTION OF THE INVENTION

In the present invention, examples of the propylene-based resins as the component (A) contained in the olefin-based thermoplastic elastomer may include propylene homopolymer, or copolymers of propylene with the other α-olefin having about 2 to about 10 carbon atoms such as ethylene, 1-butene, 3-methyl-1-butene, 1-pentene, 4-methyl-1-pentene, 1-hexene, 4-methyl-1-hexene, 1-heptene, 1-octene and 1-decene. Specific examples of the propylene-based resins may include propylene-ethylene copolymers, propylene-1-butene copolymers, propylene-ethylene-1-butene copolymers, propylene-4-methyl-1-pentene copolymers or the like. Among these propylene-based resins, propylene homopolymer and propylene-ethylene copolymers are preferred. The ethylene content of the propylene-ethylene copolymers is preferably not more than 15% by weight, more preferably not more than 10% by weight. The lower limit thereof is preferably 1% by weight.

The propylene-based resin used in the present invention may be produced by any polymerization methods using either Ziegler catalysts or metallocene catalysts. Among these methods, those using metallocene catalysts are preferred.

Meanwhile, the polymerization methods for the production of propylene-based resins using metallocene catalysts have been already known in the arts. For example, the propylene-based resin may be produced by polymerizing propylene, etc. in the presence of a metallocene catalyst comprising (a) a cyclopentadienyl group-containing compound of a transition metal such as titanium, zirconium and hafnium, (b) an aluminum oxy compound, a Lewis acid, an ionic compound capable of reacting with the component (a) to convert the component (a) into a cation, or clays, clay minerals and an ion-exchanging layer compound, and, if required, (c) an organoaluminum compound, by vapor-phase polymerization method, bulk polymerization method, solution polymerization method or the like.

The propylene-based resin used in the present invention preferably has a ratio (Mw/Mn) of weight-average molecular weight (Mw) to number-average molecular weight (Mn) of 2.5:1 to 4.0:1, more preferably 2.5:1 to 3.5:1, when measured by gel permeation chromatography. When the ratio (Mw/Mn) of weight-average molecular weight (Mw) to number-average molecular weight (Mn) is less than 2.5:1, the obtained olefin-based thermoplastic elastomer may exhibit a small first normal stress difference ($N_1$) which is determined by the step shear test as described in detail hereinafter. As a result, the ratio ($N_1$/SS) of the first normal stress difference ($N_1$) to the shear stress (SS) is too low, so that flow marks may tend to be caused. On the other hand, when the ratio (Mw/Mn) of weight-average molecular weight (Mw) to number-average molecular weight (Mn) is more than 4.0:1, the obtained olefin-based thermoplastic elastomer may exhibit a large first normal stress difference ($N_1$). As a result, the ratio ($N_1$/SS) of the first normal stress difference ($N_1$) to the shear stress (SS) is too high, so that uneven luster or weld marks may tend to be caused.

The propylene-based resin used in the present invention preferably has a melt flow rate of 10 to 120 g/10 minutes, more preferably 15 to 100 g/10 minutes, when measured at 230° C. under a load of 21.18 N according to JIS K7210. When the melt flow rate of the propylene-based resin is less than 10 g/10 minutes, the obtained olefin-based thermoplastic elastomer may tend to be deteriorated in moldability. On the other hand, when the melt flow rate of the propylene-based resin is more than 120 g/10 minutes, it may become difficult to impart a sufficient mechanical strength to the obtained olefin-based thermoplastic elastomer.

In the present invention, examples of the olefin-based copolymer rubbers as the component (B) contained in the olefin-based thermoplastic elastomer may include copolymers obtained by mutually copolymerizing two or more α-olefins having about 2 to about 10 carbon atoms such as ethylene, propylene, 1-butene, 3-methyl-1-butene, 1-pentene, 4-methyl-1-pentene, 1-hexene, 4-methyl-1-hexene, 1-heptene, 1-octene, 1-decene or the like; or copolymers obtained by copolymerizing the above copolymers with non-conjugated dienes such as 1,4-hexadiene, 4-methyl-1,4-hexadiene, 5-methyl-1,4-hexadiene, 6-methyl-1,5-heptadiene, 1,4-octadiene, 7-methyl-1,6-octadiene, cyclohexadiene, cyclooctadiene, dicyclopentadiene, 5-methylene-2-norbornene, 5-ethylidene-2-norbornene, 5-butylidene-2-norbornene, 5-isopropenyl-2-norbornene or the like. Specific examples of the olefin-based copolymer rubbers may include ethylene-propylene copolymers, ethylene-1-butene copolymers, ethylene-1-hexene copolymers, ethylene-1-octene copolymers, propylene-1-butene copolymers, ethylene-propylene-1,4-hexadiene copolymers, ethyolene-propylene-dicyclopentadiene copolymers, ethylene-propylene-5-ethylidene-2-norbornene copolymers or the like.

Among these olefin-based copolymer rubbers, copolymers of ethylene with the other α-olefin or copolymers of ethylene with the other α-olefin and non-conjugated diene are preferred. The content of the α-olefin in the above copolymers is preferably 10 to 60% by weight, more preferably 15 to 55% by weight. When the content of the other α-olefin is less than 10% by weight, the obtained olefin-based thermoplastic elastomer may tend to be deteriorated in mechanical strength such as low-temperature impact strength. On the other hand, when the content of the other α-olefin is more than 60% by weight, the obtained olefin-based thermoplastic elastomer may tend to be deteriorated in mechanical strength such as heat-resistant stiffness. Meanwhile, the content of the non-conjugated diene contained in the above olefin-based copolymers which are further copolymerized with the non-conjugated diene, is preferably 0.5 to 20% by weight, more preferably 1 to 15% by weight.

The olefin-based copolymer rubber used in the present invention may also be produced by any copolymerization method using either Ziegler catalysts such as vanadium compounds or metallocene catalysts.

The olefin-based copolymer rubber used in the present invention has a melt flow rate of preferably 0.1 to 20 g/10 minutes, more preferably 0.2 to 15 g/10 minutes, when measured at 230° C. under a load of 21.18 N according to JIS K7210. When the melt flow rate of the olefin-based copolymer rubber is less than 0.1 g/10 minutes, the obtained olefin-based thermoplastic elastomer may tend to be deteriorated in moldability. On the other hand, the melt flow rate of the olefin-based copolymer rubber is more than 20 g/10 minutes, it may become difficult to impart a sufficient mechanical strength to the obtained olefin-based thermoplastic elastomer.

The olefin-based thermoplastic elastomer of the present invention contains preferably 30 to 70% by weight of the propylene-based resin as the component (A) and 70 to 30% by weight of the olefin-based copolymer rubber as the component (B), more preferably 35 to 60% by weight of the component (A) and 65 to 40% by weight of the component (B). When the content of the component (A) is less than 30% by weight and the content of the component (B) is more than 70% by weight, the obtained olefin-based thermoplastic elastomer may tend to be deteriorated in mechanical strength such as heat-resistant stiffness. On the other hand, when the content of the component (A) is more than 70% by weight and the content of the component (B) is less than 30% by weight, the obtained olefin-based thermoplastic elastomer may tend to be deteriorated in mechanical strength such as low-temperature impact strength.

Further, the olefin-based thermoplastic elastomer may further contain a styrene-based thermoplastic elastomer as a component (C) in order to enhance its mechanical strength such as low-temperature impact strength and tensile break strength as well as scratch or scuff resistance of the surface of molded product obtained therefrom. The content of the component (C) is preferably 1 to 20 parts by weight, more preferably 3 to 18 parts by weight based on 100 parts by weight of the sum of the components (A) and (B). When the content of the styrene-based thermoplastic elastomer (C) more than 20 parts by weight, the obtained olefin-based thermoplastic elastomer may tend to fail to satisfy the ratio ($N_1$/SS) of first normal stress difference ($N_1$) to shear stress (SS) of from 0.6:1 to 1.4:1 as defined by the present invention. In such a case, the ratio ($N_1$/SS) of the olefin-based thermoplastic elastomer may be controlled by adding a softening agent for rubbers as described below, thereto.

The styrene-based thermoplastic elastomer as the component (C) may be in the form of a block copolymer having a linear, branched or radially-extending molecular structure, or a combination thereof, and containing aromatic vinyl polymer blocks as hard segments, and conjugated diene polymer blocks or conjugated diene-aromatic vinyl random copolymer blocks as soft segments. Examples of these styrene-based thermoplastic elastomers may be exemplified aromatic vinyl-conjugated diene block copolymers constituted by blocks as hard segments aromatic vinyl polymer and as soft segments conjugated diene polymer blocks or conjugated diene-aromatic vinyl random copolymer blocks, and hydrogenated aromatic vinyl-conjugated diene block copolymers, in which double bonds of the latter conjugated diene may be hydrogenated.

Meanwhile, examples of the aromatic vinyls contained in these block copolymers may include styrene, α-methyl styrene, p-methyl styrene, dimethyl styrene or the like. Among these aromatic vinyls, styrene is preferred. Examples of the conjugated dienes may include butadiene, isoprene, 1,3-pentadiene, 2,3-dimethyl-1,3-butadiene or the like. Among these conjugated dienes, butadiene, isoprene or a mixture of butadiene and isoprene are preferred.

The above block copolymer as the component (C) contains the aromatic vinyl polymer blocks in an amount of preferably 5 to 50% by weight, more preferably 10 to 40% by weight. In addition, the conjugated diene polymer blocks are in the form of a hydrogenated product in which preferably not less than 80%, more preferably not less than 95% of double bonds thereof are hydrogenated.

Further, the above block copolymer as the component (C) has a melt flow rate of preferably 0.05 to 20 g/10 minutes, more preferably 0.1 to 15 g/10 minutes when measured at 230° C. under a load of 21.18 N according to JIS K7210.

The olefin-based thermoplastic elastomer of the present invention may further contain a softening agent for hydrocarbon-based rubbers as a component (D) in order to usually impart moldability, flexibility or the like thereto. The content of the component (D) is preferably 1 to 20 parts by weight, more preferably 3 to 18 parts by weight based on 100 parts by weight of the sum of the components (A) and (B). When the composition of the present invention also contains the component (C) in addition to the component (D), the content of the component (D) is preferably not more than 150 parts by weight based on 100 parts by weight of the component (C) from the standpoint of anti-bleed property of the composition.

The softening agent for hydrocarbon-based rubbers as the component (D) is generally in the form of a mixture of an aromatic ring compound, a naphthene ring compound and a paraffin chain compound. These softening agents for hydrocarbon-based rubbers are mineral oil-based high-boiling petroleum fraction which are classified into paraffin-based oils containing paraffin chain carbon atoms in an amount of not less than 50% based on total carbon atoms; naphthene-based oils containing naphthene-ring carbon atoms in an amount of 30 to 45% based on total carbon atoms; and aromatic oils containing aromatic-ring carbon atoms in an amount of not less than 30% based on total carbon atoms. Among these softening agents, paraffin-based oils are preferred.

The softening agent for hydrocarbon-based rubbers as the component (D) has a weight-average molecular weight of preferably 300 to 2,000, more preferably 500 to 1,500; a 40° C. kinematic viscosity of preferably 20 to 800 cSt, more preferably 50 to 600 cSt; a fluid point of preferably −40 to 0° C., more preferably −30 to 0° C.; and a flash point of preferably 200 to 400° C., more preferably 250 to 350° C.

The olefin-based thermoplastic elastomer of the present invention contains the propylene-based resin (A) and the olefin-based copolymer rubber (B) as essential components, and may further contain, if required, the styrene-based thermoplastic elastomer as the component (C) and the softening agent for hydrocarbon-based rubbers as the component (D). Moreover, the olefin-based thermoplastic elastomer may be kinetically heat-treated in the presence of the organic peroxide, if required.

Here, the "kinetic heat-treatment" means to knead the above composition while kept in a molten state using a kneader. The kinetic heat-treatment allows ultra-high molecular weight polymers contained in the propylene-based resin as the component (A) to be decomposed by the effect of the organic peroxide, thereby not only enhancing the fluidity of the olefin-based thermoplastic elastomer but also reducing the first normal stress difference ($N_1$) and the shear stress (SS) upon step shear test as described in detail below.

The organic peroxides used in the kinetic heat-treatment may be those ordinarily used for the production of conventional partially-cross-linked olefin-based thermoplastic elastomers. Specific examples of the organic peroxides may include dialkyl peroxides such as di-t-butyl peroxide, t-butylcumyl peroxide, dicumyl peroxide, 2,5-dimethyl-2,5-di(t-butylperoxy) hexane, 2,5-dimethyl-2,5-di(t-butylperoxy) hexyne-3, 1,3- or 1,4-bis(t-butylperoxyisopropyl) benzene and 1,1-di(t-butylperoxy)-3,3,5-trimethylcyclohexane; peroxyesters such as t-butylperoxybenzoate, t-butylperoxyisopropyl carbonate, 2,5-dimethyl-2,5-di(benzoylperoxy) hexane and 2,5-dimethyl-2,5-di(benzoylperoxy) hexyne-3; diacyl peroxides such as lauroyl peroxide, benzoyl peroxide, p-chlorobenzoyl peroxide and 2,4-dichlorobenzoyl peroxide; hydroperoxides such as cumene hydroperoxide and diisopropylbenzene hydroperoxide; or the like. Among these organic peroxides, dialkyl peroxides and peroxyesters are preferred, and dicumyl peroxide, 2,5-dimethyl-2,5-di(t-butylperoxy) hexane, 2,5-dimethyl-2,5-di(t-butylperoxy) hexyne-3, 1,3- or 1,4-bis(t-butylperoxyisopropyl) benzene, 1,1-di(t-butylperoxy)-3,3,5-trimethylcyclohexane, 2,5-dimethyl-2,5-di(benzoylperoxy) hexane and 2,5-dimethyl-2,5-di(benzoylperoxy) hexyne-3 are more preferred.

The organic peroxide may be used in any amount as long as the ultra-high molecular weight polymers contained in the component (A) can be effectively. The amount of the organic peroxide used is preferably in the range of 0.005 to 0.3 part by weight, more preferably 0.01 to 0.25 part by weight based on 100 parts by weight of the sum of the propylene-based resin as the component (A) and the olefin-based copolymer rubber as the component (B).

The olefin-based thermoplastic elastomer of the present invention may be produced by the process of appropriately selecting the propylene-based resin as the component (A) and the olefin-based copolymer rubber as the component (B), and appropriately controlling the amount of the organic peroxide or the kneading time. More specifically, the olefin-based thermoplastic elastomer of the present invention can be produced, for example, by selecting the propylene-based resin as the component (A) having a ratio (Mw/Mn) of the weight-average molecular weight to the number-average molecular weight of 2.5:1 to 4.0:1. In this case, a slight amount of the propylene-based resin as the component (A) whose ratio (Mw/Mn) is out of the range of 2.5:1 to 4.0:1, may be added to the composition as long as the obtained composition still has properties which are within the scope of the present invention.

Also, the olefin-based thermoplastic elastomer of the present invention may further contain other resins or rubbers, unless the aimed effects of the present invention are adversely affected by the addition thereof. Moreover, the olefin-based thermoplastic elastomer of the present invention may further contain, if required, various additives ordinarily used to thermoplastic elastomers, such as antioxidants, heat stabilizers, light stabilizers, ultraviolet light absorbers, anti-static agents, anti-blocking agents, lubricants, anti-fogging agents, dispersants, neutralizers, nucleating agents, conductivity-imparting agents, antibacterial agents, flame retardants, colorants, fillers and the like, unless the aimed effects of the present invention are adversely affected by the addition thereof.

The olefin-based thermoplastic elastomer of the present invention may be produced by uniformly mixing the propylene-based resin as the component (A) and the olefin-based copolymer rubber as the component (B) together with, if required, the styrene-based thermoplastic elastomer as the component (C), the softening agent for hydrocarbon-based rubbers as the component (D) and other additives all of which are usually used in the form of a powder or granules, by means of Henschel mixer, Super mixer, V-type blender, tumbler-blender, ribbon blender or the like, and melt-kneading the resultant mixture at a temperature of about 180 to about 280° C. by means of Henschel mixer, Super mixer, V-type blender, tumbler-blender, ribbon blender or the like. Meanwhile, upon the mixing and melt-kneading, the mixture may be kinetically heat-treated under the coexistence of the above organic peroxide. Also, as the components (B) and (D), there may be used an oil extended rubber prepared by preliminarily adding the component (D) during the production of the component (B).

The olefin-based thermoplastic elastomer of the present invention is required to have a ratio ($N_1/SS$) of a first normal stress difference ($N_1$) to a shear stress (SS) of 0.6:1 to 1.4:1, preferably 0.7:1 to 1.3:1 when the step shear test is conducted at a temperature of 200° C. and a shear rate 25.1 $sec^{-1}$.

When the ratio ($N_1/SS$) of the first normal stress difference ($N_1$) to the shear stress (SS) is less than 0.6:1, the melt front stress upon molding is too large, so that the obtained molded product suffers from jetting phenomenon or flow marks. On the other hand, when the ratio ($N_1/SS$) of the first normal stress difference ($N_1$) to the shear stress (SS) is more than 1.4:1, the melt front stress upon molding is too small, so that the obtained molded product suffers from not only uneven luster but also weld marks due to deterioration in fusion pressure at its welded portions. Thus, when the ratio ($N_1/SS$) is out of the range specified by the present invention, the obtained molded product undergoes appearance defects.

The shear stress (SS) of the olefin-based thermoplastic elastomer of the present invention is preferably not more than 15,000 Pa. When the shear stress (SS) is more than 15,000 Pa, the fluidity of the elastomer upon molding is lowered, so that the obtained molded product tends to undergo not only flow marks but also other appearance defects such as short shots and draws or sink marks. The lower limit thereof is preferably 6,000 Pa.

The shear stress (SS) and the first normal stress difference ($N_1$) are determined as stationary values thereof obtained when measured by the following method. That is, a cone plate having a diameter of 25 mm and a cone angle of 0.1 radian is subjected to step shear test at a temperature of 200° C. and a shear rate of 25.1 $sec^{-1}$ using a kinematic viscoelastometer "MECHANICAL SPECTROMETER RMS-800" manufactured by Rheometrics Corp.

The olefin-based thermoplastic elastomer of the present invention has a melt flow rate of preferably 1 to 60 g/10 minutes, when measured at 230° C. under a load of 21.18 N according to JIS K7210; a flexural modulus of preferably not more than 300 MPa, when measured according to JIS K7171; and a notched Izod impact strength of preferably not less than 30 $kJ/m^2$, when measured at −40° C. according to JIS K7110. The lower limit of the flexural modulus is more preferably 50 Mpa.

Figure 1A:
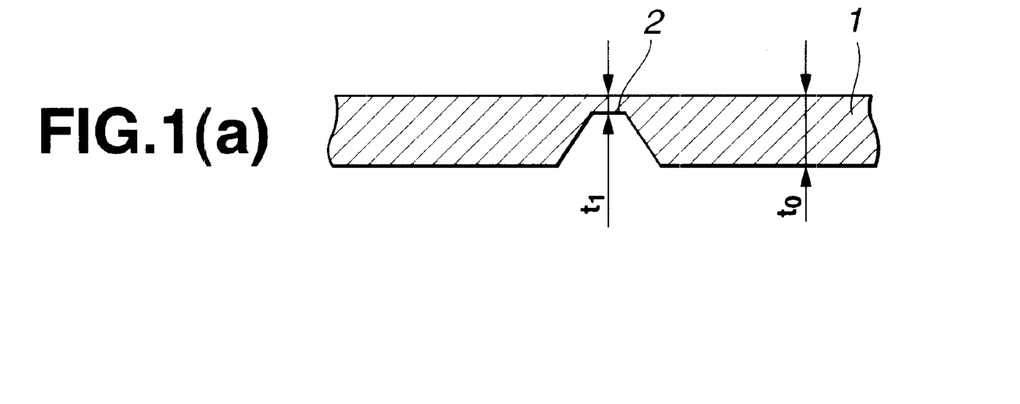
FIG. 1(a) is a sectional view showing a thin-wall portion of a molded product produced from an olefin-based thermoplastic elastomer according to the present invention; FIG.
Figure 1B:
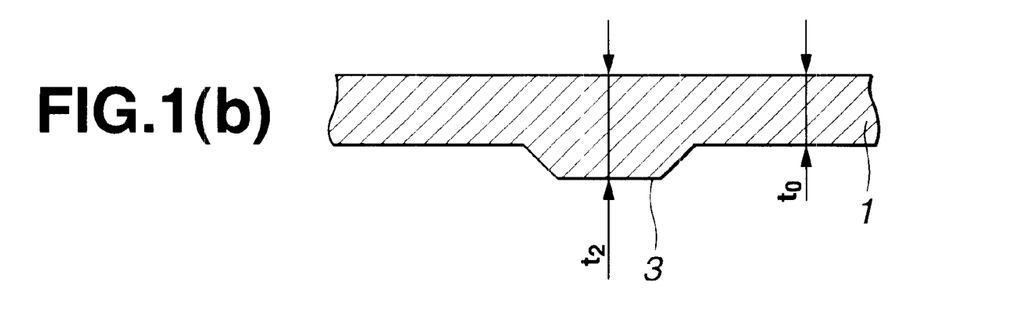
Figure 1C:
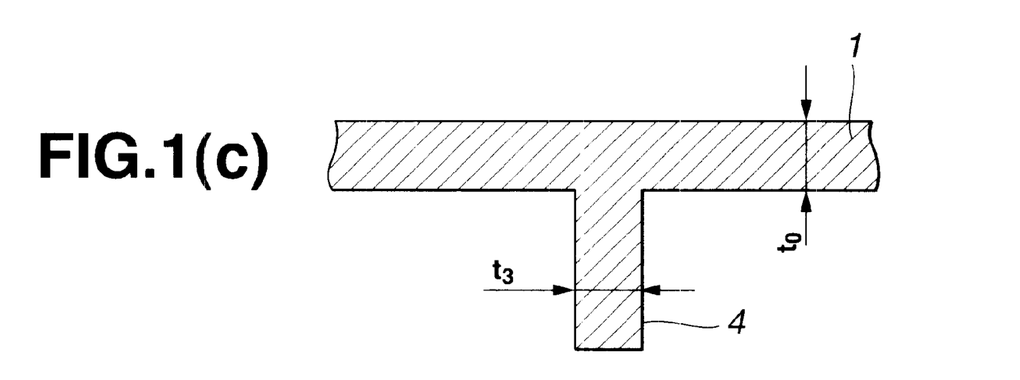
FIG. 1(c) is a sectional view showing a rib of the molded product shown in FIG. 1(a).

The olefin-based thermoplastic elastomer of the present invention may be molded into desired molded products by extrusion-molding method, injection-molding method, injection compression-molding method, injection-foaming method, injection hollow molding method, compression-molding method or the like. In particular, the olefin-based thermoplastic elastomer of the present invention is suitable for the production of a molded product such as automobile interior trims or parts having embossed patterns or the like, which has a large change in thickness and comprises, as shown in FIG. 1(a) to FIG. 1(c), a flat base plate 1 having a thickness ($t_0$), a thin-wall portion 2 having a thickness ($t_1$)

in the range of from 5 to 50% of the thickness ($t_0$) of the flat base plate ($t_1=t_0\times(0.05\sim0.5)$) (refer to FIG. 1(a)), a thick-wall portion 3 having a thickness ($t_2$) in the range of from 110 to 200% of the thickness ($t_0$) of the flat base plate ($t_2=t_0\times(0.1\sim2.0)$)(refer to FIG. 1(b)), a rib 4 having a thickness ($t_3$) in the range of from 5 to 200% of the thickness ($t_0$) of the flat base plate ($t_3=t_0\times(0.05\sim2.0)$) (refer to FIG. 1(c)) and/or an opening, e.g., for the production of an injection-molded cover for accommodating an air bag. Such an air bag cover may be molded singly or in the form of a composite integrated with instrument panel, door panel center panel, pillar panel and the like.

As to the conditions for injection-molding the olefin-based thermoplastic elastomer of the present invention, the molding temperature is in the range of usually about 100 to about 300° C., preferably about 150 to about 280° C.; the injection pressure is in the range of usually about 5 to about 100 MPa, preferably about 10 to about 80 MPa; and the mold temperature is in the range of usually about 20 to about 80° C., preferably about 20 to about 60° C.

In accordance with the present invention, there is provided an olefin-based thermoplastic elastomer composition comprising a propylene-based resin and an olefin-based copolymer rubber, which is not only excellent in moldability, transferability of embossed patterns and mechanical strength, but also capable of providing a molded product being free from appearance defects such as uneven luster, weld marks and flow marks even with a large change in thickness.

EXAMPLES

The present invention will be described in more detail below by reference to the following examples. However, these examples are only illustrative and not intended to limit the present invention thereto.

The propylene-based resin (A), the olefin-based copolymer rubber (B), the styrene-based thermoplastic elastomer (C), the softening agent for hydrocarbon-based rubbers (D), and the organic peroxide used in the following examples and comparative examples are shown below.

(A) Propylene-based resin:

A-1: Propylene homopolymer produced by the polymerization using Ziegler catalyst, and having an Mw/Mn ratio of 3.3 and a melt flow rate of 50 g/10 minutes;

A-2: Propylene-ethylene block copolymer produced by the polymerization using Ziegler catalyst, and having an ethylene content of 4.0% by weight, an Mw/Mn ratio of 4.0 and a melt flow rate of 100 g/10 minutes;

A-3: Propylene-ethylene random copolymer produced by the polymerization using metallocene catalyst, and having an ethylene content of 2.3% by weight, an Mw/Mn ratio of 3.0 and a melt flow rate of 60 g/10 minutes;

A-4: Propylene-ethylene block copolymer produced by the polymerization using Ziegler catalyst, and having an ethylene content of 4.0% by weight, an Mw/Mn ratio of 7.0 and a melt flow rate of 60 g/10 minutes; and A-5: Propylene-ethylene random copolymer produced by the polymerization using Ziegler catalyst, and having an ethylene content of 3.5% by weight, an Mw/Mn ratio of 4.8 and a melt flow rate of 50 g/10 minutes.

(B) Olefin-based copolymer rubber:

B-1: Ethylene-1-octene copolymer rubber having a 1-octene content of 24% by weight and a melt flow rate of 2.3 g/10 minutes;

B-2: Ethylene-propylene copolymer rubber having a propylene content of 26% by weight and a melt flow rate of 3.0 g/10 minutes;

B-3: Ethylene-propylene-5-ethylidene-2-norbornene copolymer rubber having a propylene content of 25% by weight, a 5-ethylidene-2-norbornene content of 15% by weight and a melt flow rate of 1.5 g/10 minutes; and B-4: Ethylene-1-hexene copolymer rubber having a 1-hexene content of 23% by weight and a melt flow rate of 1.0 g/10 minutes.

(C) Styrene-based thermoplastic elastomer:

C-1: Hydrogenated product of a block copolymer composed of styrene homopolymer blocks and butadiene homopolymer blocks, having a styrene content of 29% by weight, a hydrogenation percentage of 99% and a melt flow rate of 0.1 to 0.5 g/10 minutes; and C-2: Hydrogenated product of a block copolymer composed of styrene homopolymer blocks and butadiene/styrene random copolymer blocks, having a styrene content of 10% by weight, a hydrogenation percentage of 99% and a melt flow rate of 8 to 10 g/10 minutes.

Meanwhile, the melt flow rates of the above components (A), (B) and (C) were measured at a temperature of 230° C. under a load of 21.18 N according to JIS K7210.

(D) Softening agent for hydrocarbon-based rubbers:

D-1: Paraffin-based oils having a weight-average molecular weight of 746, a 40° C. kinematic viscosity of 382 cSt, a fluid point of −15° C. and a flash point of 300° C.

Organic peroxide:

2,5-dimethyl-2,5-di(t-butylperoxy) hexane

Examples 1 to 19 and Comparative Examples 1 to 3

0.1 part by weight of tetrakis[methylene-3-(3',5'-di-t-butyl-4'-hydroxyphenyl) propionate] methane as an antioxidant was added to 100 parts by weight of the sum of the components (A), (B), (C) and (D) and the organic peroxide as shown in Table 1. The resultant mixture was melt-kneaded and extruded into pellets at 200° C. using a twin-screw extruder having a cylinder diameter of 45 mm and a ratio L/D of 33 ("PCM45" manufactured by Ikegai Tekko Co., Ltd.), thereby obtaining an olefin-based thermoplastic elastomer.

The melt flow rates of the thus obtained olefin-based thermoplastic elastomers were measured by the following method. The results are shown in Table 1.

Melt Flow rate:

The melt flow rate was measured at 230° C. under a load of 21.18 N according to JIS K7210.

Further, the respective olefin-based thermoplastic elastomers produced above were subjected to step shear test by the following method to determine the shear stress (SS) and the first normal stress difference ($N_1$) and the ratio ($N_1$/SS) of the first normal stress difference ($N_1$) to the shear stress (SS) was calculated therefrom. The results are shown in Table 1.

Shear stress (SS) and first normal stress difference ($N_1$):

Using a kinematic viscoelastometer "MECHANICAL SPECTROMETER RMS-800" manufactured by Rheometrics Corp., a cone plate having a diameter of 25 mm and a cone angle of 0.1 radian was subjected to step shear test at a temperature of 200° C. and a shear rate of 25.1 sec$^{-1}$. The shear stress (SS) and the first normal stress difference ($N_1$) were respectively determined as stationary values thereof obtained upon the above measurement.

Then, the respective obtained olefin-based thermoplastic elastomers were injection-molded using an in-line screw type injection molding machine ("IS170" manufactured by Toshiba Kikai Co., Ltd.) at an injection temperature of 220° C., an injection pressure of 50 MPa and a mold temperature of 40° C., thereby obtaining a test piece having the following shape. The thus obtained test piece was observed and measured by the following methods to determine whether or not any uneven luster, weld marks and flow marks were caused thereon, and to examine gloss of embossed patterns. The results are shown in Table 1.

Figure 2A:
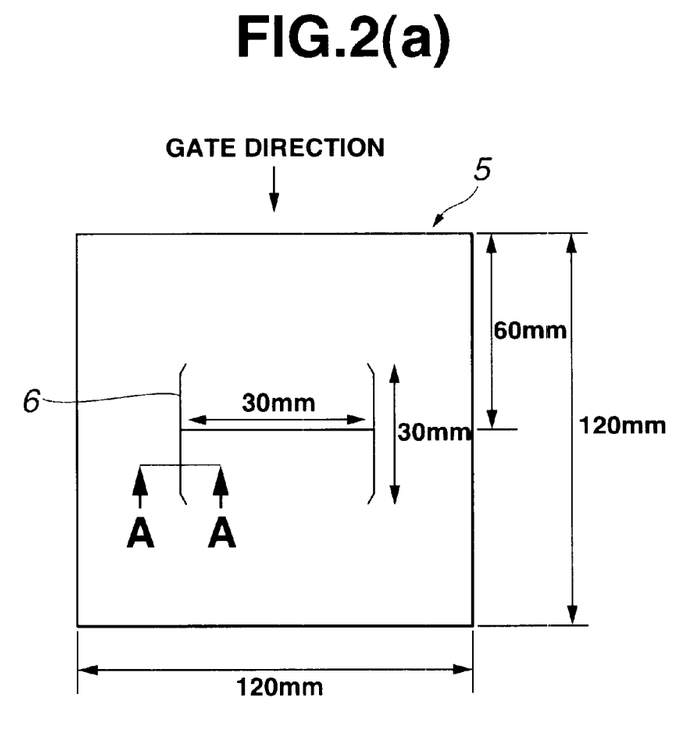
FIG. 2(a) is a top plan view showing a test piece for evaluation of uneven luster and weld marks which is produced from an olefin-based thermoplastic elastomer according to the present invention.
Figure 2B:
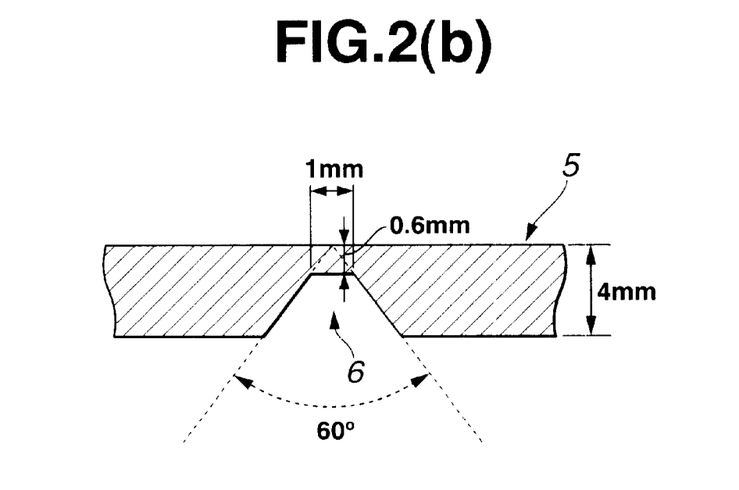
FIG. 2(b) is a sectional view taken along the line A—A of FIG. 2(a).

Uneven luster and weld marks:

(1) As shown in FIG. 2(a) and FIG. 2(b), a 120 mm-square and 4 mm-thick flat plate 5 was provided at a center of one surface thereof with a linear thin-wall portion 6 including a bottom having a thickness of 0.6 mm, a width of 1 mm and a length of 30 mm and opposite slant side surfaces which form a groove widened outwardly at an angle of 60° when viewed in section. Further, similar two 30 mm-long thin-wall portions perpendicularly extending through the opposite ends of the above central thin-wall portion and each having at opposite ends thereof slightly bent portions, were formed on the same surface of the flat plate, thereby preparing a test piece (1).

Figure 3A:
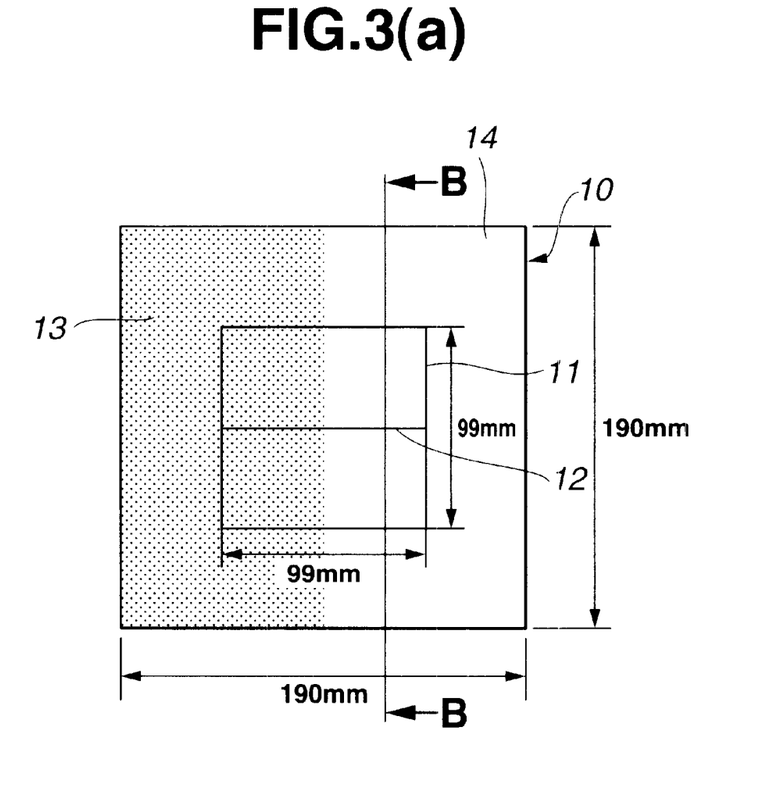
FIG. 3(a) is a top plan view showing another test piece for evaluation of uneven luster and weld marks which is produced from an olefin-based thermoplastic elastomer according to the present invention.
Figure 3B:
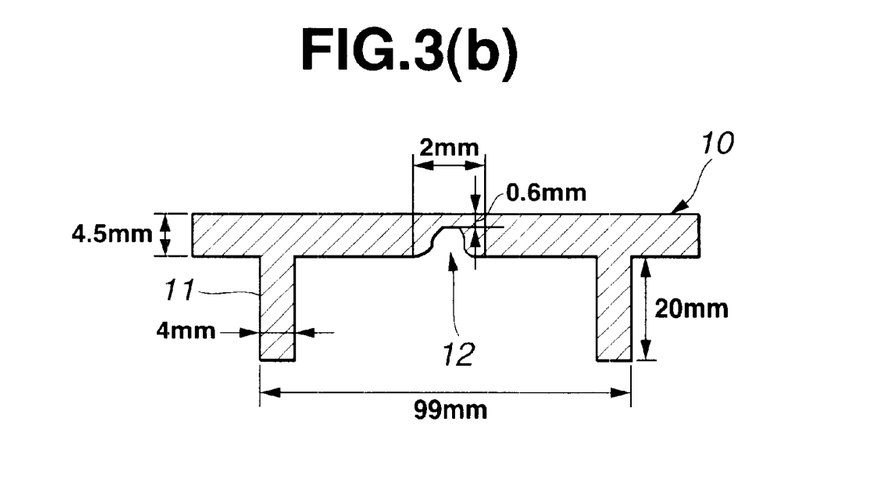
FIG. 3(b) is a sectional view taken along the line B—B of FIG. 3(a).

(2) As shown in FIG. 3(a) and FIG. 3(b), a 190 mm-square and 4 mm-thick flat plate 10 was provided at a center of one surface thereof with a square frame-like rib 11 having a thickness of 4 mm, a height of 20 mm and an inside dimension of 91 mm square. Further, a linear thin-wall portion 12 having a thickness of 0.6 mm and a width of about 2 mm was formed on the same surface of the flat plate so as to centrally extend across an inside of the square frame-like rib. In addition, on one half of the same surface of the flat plate which was divided from the other half by a center line extending perpendicular to the linear thin-wall portion, Grain C 13 each having a depth of 100 $\mu$m were formed while the other half surface 14 remained in mirror-polished state, thereby preparing a test piece (2).

The appearances of the respective test pieces (1) and (2) were visually observed, and uneven luster and weld marks thereof were evaluated according to the following criteria among which the ranks A to C were practically acceptable.

A: No or almost no uneven luster and weld marks were recognized.

B: Slight uneven luster was recognized, but almost no weld marks were recognized.

C: Slight uneven luster and weld marks were recognized.

D: Severe uneven luster and weld marks were recognized.

Flow marks:

A thermoplastic elastomer was injected through a gate located on one longitudinal side of a mold cavity having a width of 100 mm, a length of 360 mm and a thickness of 2 mm to prepare a test piece. The thus obtained test piece was heated at a temperature of 100° C. for one hour in an oven. Then, the test piece was visually observed to determine whether or not any flow marks (wave-like flow patterns) were caused on the surface thereof, and evaluated according to the following criteria among which the ranks A and B were practically acceptable.

A: No flow marks were recognized, or only slight flow marks were recognized at tip end portions.

B: Some flow marks were recognized at positions spaced apart by 200 mm or more from the gate and, therefore, not noticeable.

C: Remarkable flow marks were recognized at positions spaced apart only by less than 200 mm from the gate.

Gloss of embossed patterns:

The same test piece (2) as used for the evaluation of uneven luster and weld marks was measured with respect to a gloss of embossed patterns formed thereon, at an incident angle of 60° according to JIS K7105.

Further, the obtained olefin-based thermoplastic elastomer was injection-molded using an in-line screw type injection molding machine ("IS130G" manufactured by Toshiba Kikai Co., Ltd.) at an injection temperature of 220° C., an injection pressure of 50 MPa and a mold temperature of 40° C., thereby obtaining a test piece for the evaluation of flexural modulus and impact strength. The thus obtained test piece was measured by the following methods to determine the flexural modulus and impact strength. The results are shown in Table 1.

Flexural modulus:

A test piece having a thickness of 4 mm, a width of 10 mm and a length of 90 mm was measured according to JIS K7171 at a span of 64 mm and a bending speed of 2 mm/minute.

Impact strength:

A notched test piece having a thickness of 4 mm, a width of 10 mm and a length of 80 mm was measured according to JIS K7110 to determine a −40° C. notched Izod impact strength thereof.

TABLE 1

|  | Ex. 1 | Ex. 2 | Ex. 3 | Ex 4 | Ex. 5 |
|---|---|---|---|---|---|
| Composition | | | | | |
| (A) Pro-based resin (wt %) | | | | | |
| A-1 | 30 | 35 | 50 | 60 | 65 |
| A-2 | | | | | |
| A-3 | | | | | |
| A-4 | | | | | |
| A-5 | | | | | |
| (B) Olefin-based, rubber (wt %) | | | | | |
| B-1 | 70 | 65 | 50 | 40 | 35 |
| B-2 | | | | | |
| B-3 | | | | | |
| B-4 | | | | | |
| (C) Styrene-based elastomer (wt. part) | | | | | |
| C-1 | | | | | |
| C-2 | | | | | |
| (D) Softening agent for rubber (wt. part) | | | | | |
| D-1 | | | | | |
| Organic peroxide (wt. part) | | | | | |
| Properties of composition | | | | | |
| MFR (g/10 min) | 8 | 11 | 14 | 20 | 22 |
| Step shear test | | | | | |
| Shear stress (SS) (×100 Pa) | 155 | 148 | 145 | 140 | 00 |
| First normal stress difference ($N_1$) (×100Pa) | 186 | 163 | 131 | 112 | 90 |
| $N_1$/SS | 1.2 | 1.1 | 0.9 | 0.8 | 0.9 |
| Uneven luster and weld marks (1) | C | B | A | A | A |
| Uneven luster and weld marks (2) | C | B | A | A | A |
| Flow marks | B | B | B | B | B |
| Gloss of embossed patterns (%) | 1.3 | 1.2 | 1.1 | 1.1 | 1.2 |
| Flexural modulus (MPa) | 220 | 250 | 460 | 580 | 620 |
| Impact strength (kJ/m$^2$) (*: non-destructive impact strength) | 100* | 90* | 66* | 44 | 25 |

TABLE 1-continued

|  | Ex. 6 | Ex. 7 | Ex. 8 | Ex. 9 | Ex. 10 |
|---|---|---|---|---|---|
| Composition | | | | | |
| (A) Pro-based resin (wt %) | | | | | |
| A-1 | | | | 50 | 50 |
| A-2 | 50 | | | | |
| A-3 | | 50 | | | |
| A-4 | | | | | |
| A-5 | | | | | |
| (B) Olefin-based rubber (wt %) | | | | | |
| B-1 | 50 | 50 | | | |
| B-2 | | | 50 | | |
| B-3 | | | | 50 | |
| B-4 | | | | | 50 |
| (C) Styrene-based elastomer (wt. part) | | | | | |
| C-1 | | | | | |
| C-2 | | | | | |
| (D) Softening agent for rubber (wt. part) | | | | | |
| D-1 | | | | | |
| Organic peroxide (wt. part) | | | | | |
| Properties of composition | | | | | |
| MFR (g/10 min) | 18 | 15 | 12 | 10 | 11 |
| Step shear test | | | | | |
| Shear stress (SS) (×100Pa) | 143 | 111 | 134 | 150 | 138 |
| First normal stress difference ($N_1$) (×100Pa) | 186 | 89 | 121 | 195 | 124 |
| $N_1$/SS | 1.3 | 0.8 | 0.9 | 1.3 | 0.9 |
| Uneven luster and weld marks (1) | B | A | B | B | A |
| Uneven luster and weld marks (2) | B | A | B | B | A |
| Flow marks | B | A | B | B | B |
| Gloss of embossed patterns (%) | 1.3 | 1.0 | 1.2 | 1.3 | 1.0 |
| Flexural modulus (MPa) | 450 | 400 | 380 | 390 | 460 |
| Impact strength (kJ/m$^2$) (*: non-destructive impact strength) | 45 | 70* | 80* | 75* | 70* |

|  | Ex. 11 | Ex. 12 | Ex. 13 | Ex. 14 | Ex. 15 |
|---|---|---|---|---|---|
| Composition | | | | | |
| (A) Propylene-based resin (wt %) | | | | | |
| A-1 | 40 | 50 | 50 | 50 | 50 |
| A-2 | | | | | |
| A-3 | | | | | |
| A-4 | 10 | | | | |
| A-5 | | | | | |
| (B) Olefin-based rubber (wt %) | | | | | |
| B-1 | 50 | 50 | 50 | 50 | 50 |
| B-2 | | | | | |
| B-3 | | | | | |
| B-4 | | | | | |
| (C) Styrene-based elastomer (wt. part) | | | | | |
| C-1 | | 10 | | 10 | 25 |
| C-2 | | | 10 | | |
| (D) Softening agent for rubber (wt. part) | | | | | |
| D-1 | | | | 10 | 25 |
| Organic peroxide (wt. part) | | | | | |
| Properties of composition | | | | | |
| MFR (g/10 min) | 15 | 17 | 20 | 23 | 25 |
| Step shear test | | | | | |
| Shear stress (SS) (×100Pa) | 144 | 114 | 120 | 100 | 135 |
| First normal stress difference ($N_1$) (×100Pa) | 194 | 114 | 120 | 100 | 176 |
| $N_1$/SS | 1.3 | 1.0 | 1.0 | 1.0 | 1.3 |
| Uneven luster and weld marks (1) | C | B | B | B | C |
| Uneven luster and weld marks (2) | C | B | B | B | C |
| Flow marks | A | A | A | A | A |
| Gloss of embossed patterns (%) | 1.4 | 1.2 | 1.1 | 1.2 | 1.3 |
| Flexural modulus (MPa) | 450 | 370 | 300 | 330 | 180 |
| Impact strength (kJ/m$^2$) (*: non-destructive impact strength) | 78* | 50* | 45* | 55* | 25 |

|  | Ex. 16 | Ex. 17 | Ex. 18 | Ex. 19 |
|---|---|---|---|---|
| Composition | | | | |
| (A) Propylene-based resin (wt %) | | | | |
| A-1 | 50 | 50 | 50 | 50 |
| A-2 | | | | |
| A-3 | | | | |
| A-4 | | | | |
| A-5 | | | | |
| (B) Olefin-based rubber (wt %) | | | | |
| B-1 | 50 | 50 | 50 | 50 |
| B-2 | | | | |
| B-3 | | | | |
| B-4 | | | | |
| (C) Styrene-based elastomer (wt. part) | | | | |
| C-1 | | | | 10 |
| C-2 | | | | |
| (D) Softening agent for rubber (wt. part) | | | | |
| D-1 | | | | |
| Organic peroxide (wt. part) | 0.05 | 0.2 | 0.3 | 0.05 |
| Properties of composition | | | | |
| MFR (g/10 min) | 22 | 28 | 40 | 19 |
| Step shear test | | | | |
| Shear stress (SS) (×100Pa) | 90 | 80 | 75 | 124 |
| First normal stress difference ($N_1$) (×100Pa) | 81 | 72 | 53 | 124 |
| $N_1$/55 | 0.9 | 0.9 | 0.7 | 1.0 |
| Uneven luster and weld marks (1) | A | A | A | B |
| Uneven luster and weld marks (2) | A | A | C | B |
| Flow marks | B | B | A | A |
| Gloss of embossed patterns (%) | 1.0 | 1.0 | 1.3 | 1.2 |
| Flexural modulus (MPa) | 470 | 400 | 380 | 350 |
| Impact strength (kJ/m$^2$) (*: non-destructive impact strength) | 45* | 33 | 10 | 65* |

|  | Com. Ex. 1 | Com. Ex. 2 | Com. Ex. 3 |
|---|---|---|---|
| Composition | | | |
| (A) Propylene-based resin (wt %) | | | |
| A-1 | | | 50 |
| A-2 | | | |
| A-3 | | | |
| A-4 | 50 | | |
| A-5 | | 50 | |
| (B) Olefin-based rubber (wt %) | | | |
| B-1 | 50 | 50 | 50 |
| B-2 | | | |
| B-3 | | | |
| B-4 | | | |
| (C) Styrene-based elastomer (wt. part) | | | |
| C-1 | | | 25 |
| C-2 | | | |

TABLE 1-continued

| | | | |
|---|---|---|---|
| (D) Softening agent for rubber (wt. part) | | | |
| D-1 Organic peroxide (wt. part) | | | |
| Properties of composition | | | |
| MFR (g/10 min) | 15 | 17 | 9 |
| Step shear test | | | |
| Shear stress (SS) (×100Pa) | 100 | 135 | 156 |
| First normal stress difference ($N_1$) (×100Pa) | 190 | 203 | 234 |
| $N_1$/SS | 1.9 | 1.5 | 1.5 |
| Uneven luster and weld marks (1) | D | D | D |
| Uneven luster and weld marks (2) | D | D | D |
| Flow marks | A | B | B |
| Gloss of embossed patterns (%) | 1.6 | 1.5 | 1.5 |
| Flexural modulus (MPa) | 450 | 430 | 320 |
| Impact strength (kJ/m$^2$) (*: non-destructive impact strength) | 70* | 55* | 60* |

What is claimed is:

1. An olefin-based thermoplastic elastomer comprising a propylene-based resin (A) and an olefin-based copolymer rubber (B), and having a ratio ($N_1$/SS) of first normal stress difference ($N_1$) to shear stress (SS) of 0.6:1 to 1.4:1 said first normal stress difference ($N_1$) and shear stress (SS) being determined by subjecting said elastomer to step shear test at a temperature of 200° C. and a shear rate of 25.1 sec$^{-1}$.

2. An olefin-based thermoplastic elastomer according to claim 1, wherein said shear stress (SS) is not more than 15,000 Pa.

3. An olefin-based thermoplastic elastomer according to claim 1, wherein the amount of the propylene-based resin (A) is 35 to 60% by weight and the amount of the olefin-based copolymer rubber (B) is 65 to 40% by weight.

4. An olefin-based thermoplastic elastomer according to claim 1, wherein the ratio (Mw/Mn) of weight-average molecular weight to number-average molecular weight of said propylene-based resin (A) is 2.5:1 to 4.0:1.

5. An olefin-based thermoplastic elastomer according to claim 4, wherein the ratio (Mw/Mn) of weight-average molecular weight to number-average molecular weight of said propylene-based resin (A) is 2.5:1 to 3.5:1.

6. An olefin-based thermoplastic elastomer according to claim 1, which further comprises a styrene-based thermoplastic elastomer (C) in an amount of 1 to 20 parts by weight based on 100 parts by weight of the sum of the propylene-based resin (A) and the olefin-based copolymer rubber (B).

7. An olefin-based thermoplastic elastomer according to claim 1, which further comprises a softening agent for hydrocarbon-based rubbers (D) in an amount of 1 to 20 parts by weight based on 100 parts by weight of the sum of the propylene-based resin (A) and the olefin-based copolymer rubber (B).

8. An olefin-based thermoplastic elastomer according to claim 1, wherein said elastomer is produced by kinematically heat-treating in the presence of an organic peroxide.

* * * * *